(12) United States Patent
Johnson et al.

(10) Patent No.: US 7,607,011 B1
(45) Date of Patent: Oct. 20, 2009

(54) SYSTEM AND METHOD FOR MULTI-LEVEL SECURITY ON A NETWORK

(75) Inventors: Tony L. Johnson, Mount Vernon, IA (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 632 days.

(21) Appl. No.: 10/893,288

(22) Filed: Jul. 16, 2004

(51) Int. Cl.
*H04L 29/06* (2006.01)
*G06F 9/455* (2006.01)

(52) U.S. Cl. .......................................... 713/166; 718/1
(58) Field of Classification Search ................ 713/166; 709/238; 718/1
See application file for complete search history.

(56) References Cited

U.S. PATENT DOCUMENTS

| | | | |
|---|---|---|---|
| 5,522,075 A * | 5/1996 | Robinson et al. | 718/100 |
| 5,535,406 A * | 7/1996 | Kolchinsky | 712/10 |
| 5,636,371 A * | 6/1997 | Yu | 703/26 |
| 5,734,865 A * | 3/1998 | Yu | 709/250 |
| 5,850,449 A * | 12/1998 | McManis | 713/161 |
| 6,075,938 A * | 6/2000 | Bugnion et al. | 703/27 |
| 6,151,618 A * | 11/2000 | Wahbe et al. | 718/1 |
| 6,304,973 B1 * | 10/2001 | Williams | 726/3 |
| 6,374,286 B1 * | 4/2002 | Gee et al. | 718/108 |
| 6,397,242 B1 * | 5/2002 | Devine et al. | 718/1 |
| 6,681,238 B1 * | 1/2004 | Brice et al. | 718/1 |
| 6,751,737 B1 * | 6/2004 | Russell et al. | 726/34 |
| 6,788,980 B1 * | 9/2004 | Johnson | 700/1 |
| 6,789,156 B1 * | 9/2004 | Waldspurger | 711/6 |
| 6,922,774 B2 * | 7/2005 | Meushaw et al. | 713/151 |
| 6,944,699 B1 * | 9/2005 | Bugnion et al. | 710/269 |
| 6,961,941 B1 * | 11/2005 | Nelson et al. | 719/319 |
| 6,976,258 B1 * | 12/2005 | Goyal et al. | 718/104 |
| 7,035,963 B2 * | 4/2006 | Neiger et al. | 711/6 |
| 7,111,303 B2 * | 9/2006 | Macchiano et al. | 719/313 |
| 7,177,967 B2 * | 2/2007 | Jeyasingh et al. | 710/260 |
| 7,210,144 B2 * | 4/2007 | Traut | 718/1 |
| 7,213,246 B1 * | 5/2007 | van Rietschote et al. | 718/1 |
| 7,228,337 B1 * | 6/2007 | Bornstein et al. | 709/217 |
| 7,237,051 B2 * | 6/2007 | Bennett et al. | 710/260 |
| 7,257,817 B2 * | 8/2007 | Cabrera et al. | 719/310 |
| 7,278,030 B1 * | 10/2007 | Chen et al. | 713/189 |
| 7,337,445 B1 * | 2/2008 | Price et al. | 719/313 |
| 7,356,735 B2 * | 4/2008 | Bennett et al. | 714/34 |
| 7,373,500 B2 * | 5/2008 | Ramelson et al. | 713/150 |
| 7,409,487 B1 * | 8/2008 | Chen et al. | 711/6 |
| 7,424,710 B1 * | 9/2008 | Nelson et al. | 718/1 |
| 7,478,173 B1 * | 1/2009 | Delco | 709/250 |
| 7,484,208 B1 * | 1/2009 | Nelson | 718/1 |
| 7,526,774 B1 * | 4/2009 | Beck et al. | 719/320 |
| 2002/0069369 A1 * | 6/2002 | Tremain | 713/201 |
| 2002/0138628 A1 * | 9/2002 | Tingley et al. | 709/227 |
| 2002/0169987 A1 * | 11/2002 | Meushaw et al. | 713/201 |

(Continued)

*Primary Examiner*—Emmanuel L Moise
*Assistant Examiner*—Techane J Gergiso
(74) *Attorney, Agent, or Firm*—Daniel M. Barbieri

(57) ABSTRACT

A method of communicating information in a system having multi-level security requirements includes receiving a packet having unencrypted data, routing the packet to a host, and processing the packet at the host such that data from the packet is maintained in the protected address space associated with the host. The host includes a number of virtual hosts, each having a unique internet protocol (IP) address, a protected address space, and a protocol stack.

13 Claims, 2 Drawing Sheets

U.S. PATENT DOCUMENTS

| | | | |
|---|---|---|---|
| 2002/0184520 A1* | 12/2002 | Bush et al. | 713/200 |
| 2002/0191572 A1* | 12/2002 | Weinstein et al. | 370/338 |
| 2003/0037089 A1* | 2/2003 | Cota-Robles et al. | 709/1 |
| 2003/0115578 A1* | 6/2003 | Liokumovich et al. | 717/138 |
| 2003/0172305 A1* | 9/2003 | Miwa | 713/201 |
| 2004/0010594 A1* | 1/2004 | Boyd et al. | 709/227 |
| 2004/0025022 A1* | 2/2004 | Yach et al. | 713/176 |
| 2004/0031025 A1* | 2/2004 | Brisset | 717/154 |
| 2004/0117539 A1* | 6/2004 | Bennett et al. | 711/6 |
| 2005/0086523 A1* | 4/2005 | Zimmer et al. | 713/201 |
| 2005/0132365 A1* | 6/2005 | Madukkarumukumana et al. | 718/1 |
| 2005/0138370 A1* | 6/2005 | Goud et al. | 713/164 |
| 2005/0210467 A1* | 9/2005 | Zimmer et al. | 718/1 |
| 2005/0223225 A1* | 10/2005 | Campbell et al. | 713/166 |
| 2005/0251867 A1* | 11/2005 | Sastry et al. | 726/34 |
| 2005/0283640 A1* | 12/2005 | Cheston et al. | 714/4 |
| 2005/0289648 A1* | 12/2005 | Grobman et al. | 726/12 |
| 2006/0020781 A1* | 1/2006 | Scarlata et al. | 713/100 |

\* cited by examiner ical data on computer systems. More particularly, the present invention relates to a system and method for multi-level security on a network.

BACKGROUND OF THE INVENTION

Generally, security of electronic data depends on confidentiality, availability, and integrity. Confidentiality of electronic data means that the data is only given to those who are supposed to have it. Availability of electronic data means that the data is not going to be lost. Integrity of electronic data means that the data will not be corrupted or modified. Ensuring the confidentiality, availability, and integrity of electronic data often requires complex and expensive hardware and/or software solutions that achieve security objectives without limiting the practical use of the data.

Conventional systems utilize hardware and/or software encryption techniques for security. For example, encryption devices are used to encrypt information any time the information is placed on a network that is not secure. Current networks, such as local area networks (LANs), do not support multiple security levels over a shared network with the necessary assurance. Such a capability would enable the reduction in cost, size, weight, and power of electronic systems because of the reduction in hardware and software components needed.

Multiple software applications are often used in the transportation industry for both air and ground transportation. These software applications can be at differing safety criticality and differing security levels. As such, multiple resources are typically needed, such as multiple processors and networks, so that security levels can be isolated and not compromised. The multiple resources use dedicated components that only function for a specified security level.

Thus, there is a need for modular open systems architectures to support running software application partitions at differing security levels on shared processors, shared operating systems, and shared networks. Further, there is a need for network nodes and switches having security features for different socket connections between partitions at differing security levels. Even further, there is a need for a system and method for multi-level security on a common network.

SUMMARY OF THE INVENTION

According to an exemplary embodiment, a method of communicating information in a system having multi-level security requirements includes receiving a packet having unencrypted data, routing the packet to a host, and processing the packet at the host such that data from the packet is maintained in the protected address space associated with the host. The host includes a number of software applications, a unique internet protocol (IP) address, a protected address space, and a protocol stack.

According to another exemplary embodiment, a system for communicating information having multi-level security requirements includes a node configured to route a packet having unencrypted data to a host and an operating system kernel. The host includes a number of software applications, separate and protected address space, and protocol stacks. The operating system kernel supports a number of virtual hosts operable to process the packet using the protocol stack at the virtual host and process data in the protected address space associated with the virtual host.

According to yet another exemplary embodiment, a system for communicating information having multi-level security requirements includes a means for receiving a packet having unencrypted data at a host and a means for processing the packet at the host such that data from the packet is maintained in the protected address space associated with the host. The host includes a number of software applications, a protected address space, and a protocol stack.

Other features and advantages of the present invention will become apparent to those skilled in the art from the following detailed description and accompanying drawings. It should be understood, however, that the detailed description and specific examples, while indicating exemplary embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings.

DETAILED DESCRIPTION OF EXEMPLARY EMBODIMENTS

Figure 1:
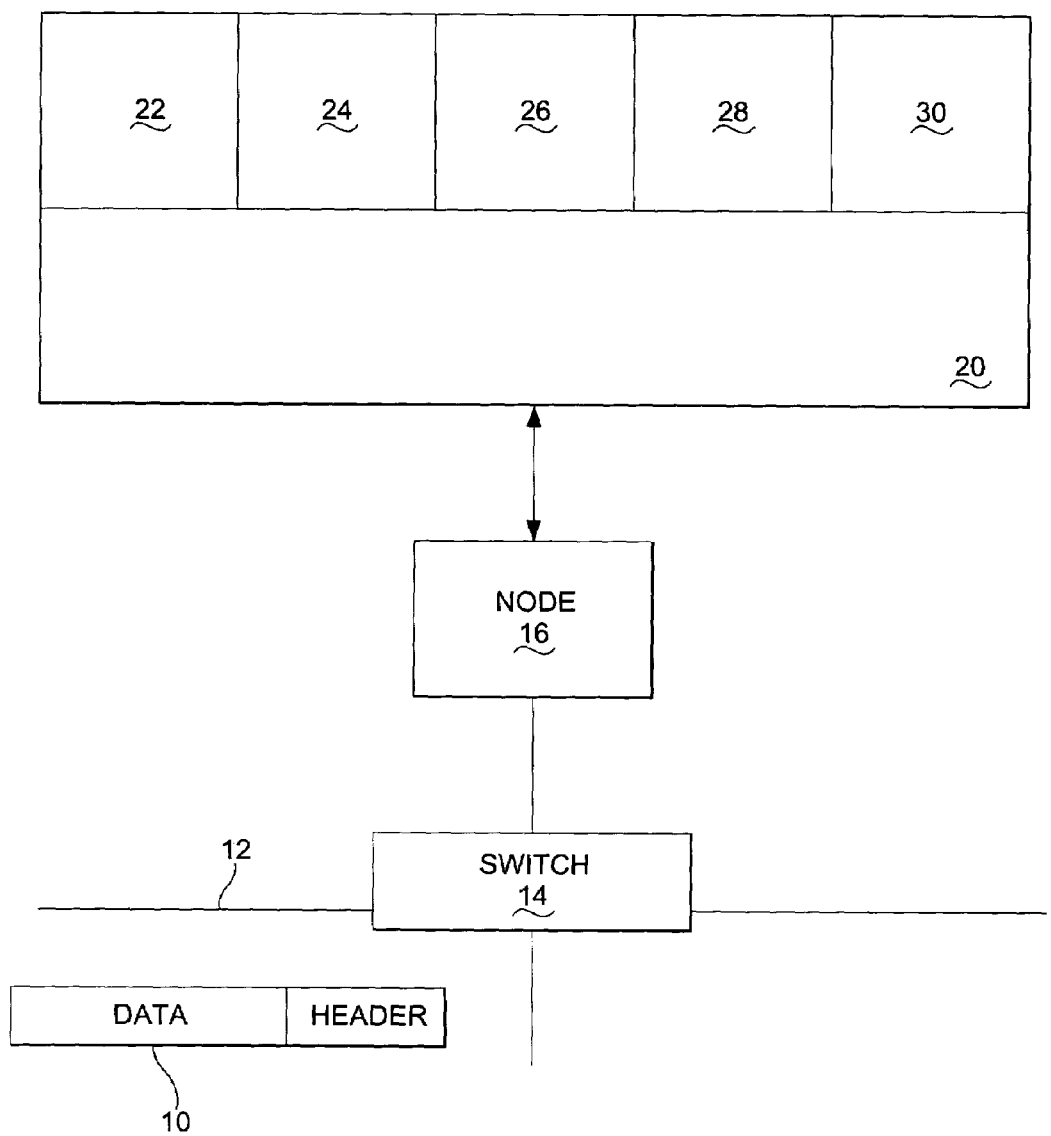
FIG. 1 is a diagrammatic representation of an information communication system having multi-level security requirements according to an exemplary embodiment.

FIG. 1 illustrates an information communication system having multi-level security requirements. A packet 10 is communicated over the system where the packet 10 has a header portion and a data portion. The header portion of the packet 10 includes internet protocol (IP) address information. The data portion of the packet 10 includes unencrypted data. The data may have a low or high level of security demand. The packet 10 is transmitted from a sender on a network over a network bus 12 to a switch 14.

The switch 14 is preferably a high assurance ethernet switch. The switch 14 routes the packet 10 to a node 16 based on a unique MAC address contained in the packet 10 and information available to the switch 14, such as location of resources on the network. The node 16 routes the packet to an appropriate virtual host based on an IP address in the packet.

The packet 10 is communicated over a bus 18 to a host 20. The host 20 is preferably an operating system residing in a microprocessor. The host 20 is provided with programmed instructions to allocate portions of memory space in the microprocessor to virtual hosts 22, 24, 26, 28, and 30. The virtual hosts 22-30 each include one or more software applications, a unique address, separate and protected address space, and a protocol stack.

Each virtual host can have one or more software applications of the same safety criticality or security level. Further, each virtual host corresponds to one unique Internet Protocol (IP) address. The host 20 may have many IP addresses but the virtual hosts 22-30 have one IP address each.

Data from the packet 10 is processed in the protected address space of the virtual host assigned to the packet 10. As such, packets containing data needing high security are contained within a protected space of memory. Within each virtual host, the protocol stack routes data in the packets to the correct socket based on a port number.

Figure 2:
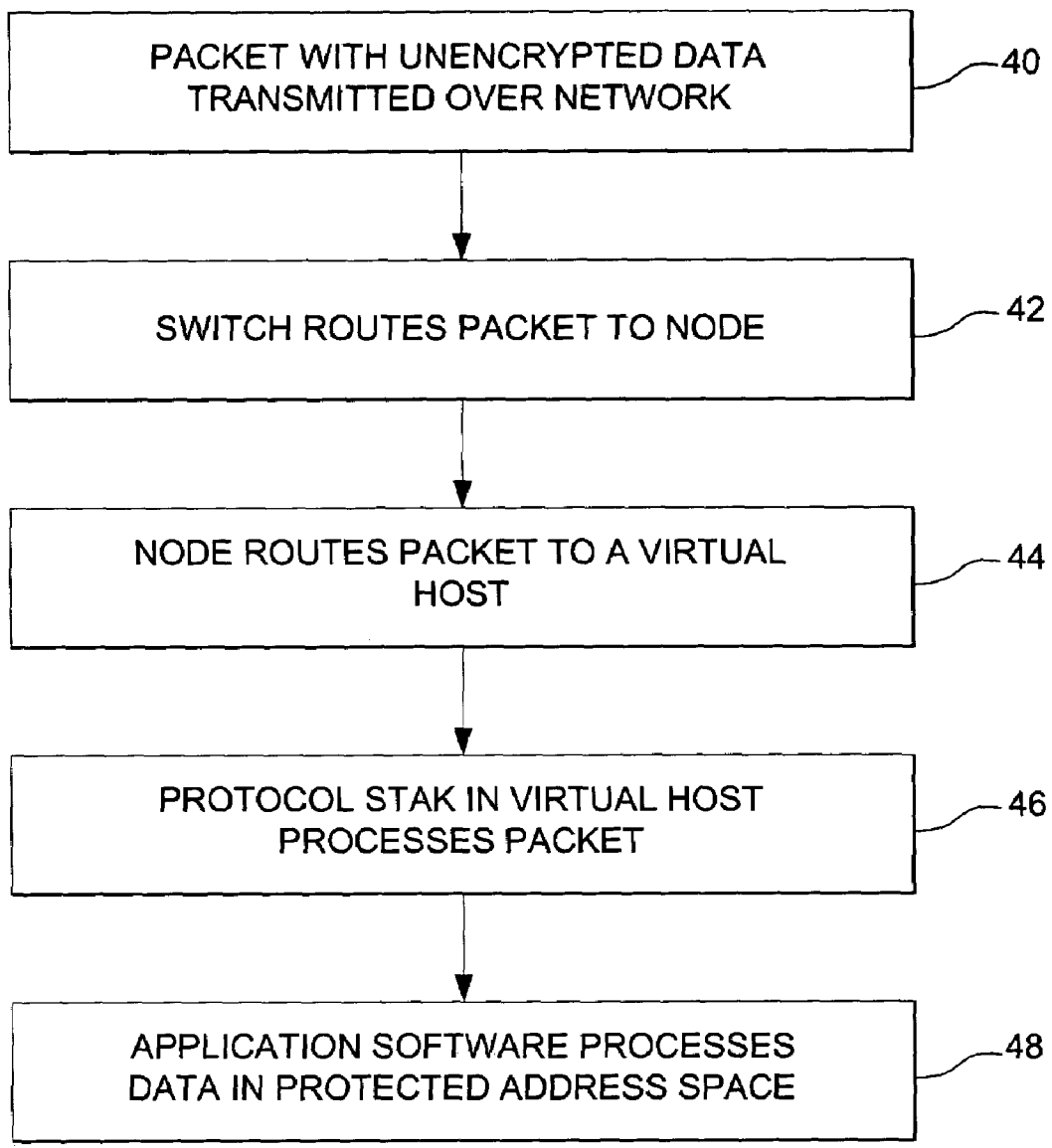
FIG. 2 is a flow diagram of the method of communicating information having multi-level security requirements in the system of FIG. 1.

FIG. 2 illustrates exemplary operations performed in a method of communicating information in a system having multi-level security requirements. Additional, fewer, or different operations may be performed. In an operation 40, a packet is transmitted with unencrypted data on an ethernet bus. The packet has an internet protocol (IP) address header and data.

In an operation 42, a high assurance ethernet switch on the network routes the packet to the correct node based on information in the packet. This information can include a MAC address. In an operation 44, the node routes the packet to a virtual host based on the IP address in the packet. The node can include a verified processor, such as the AAMP 7 processor available from Rockwell Collins, Inc. of Cedar Rapids, Iowa. The node can also include verified internet protocol (IP) router software. A virtual host refers to a separate address space having a unique network address.

Before the node routes the packet, control checks are made using programmed instructions on a verified processor. Once control checks are performed and a socket connection is established, data can be communicated through the established socket connection. A socket corresponds to a unique IP address and port number pair. As such, there is a one-to-one correspondence between sockets and IP address and port number pairs. The application partitions are virtual dividers preventing applications from sharing the same socket connection. As such, each virtual host can have many sockets, but two virtual hosts cannot share the same socket.

In an operation 46, a protocol stack in the virtual host processes the packet. In an operation 48, application software processes data in its own protected address space.

During communication, messages are delivered having a bounded latency. Statically-defined flow control tables in the node and switch enable the system integrator to bound the latency for messages through the network and is not blocked by an excess of non-critical messages. Further, data belonging to one application partition cannot be read from an application in another partition.

Once the data is read from an input/output RAM to a system RAM by a user thread calling a receive function, the data is available in both the system RAM and the data cache. Entries in a node table allow the system integrator to specify which partition can join a particular multi-cast group. The node table can also include a source verification table to prevent impersonators by ensuring that remote addresses and internet protocol addresses match expected values for the source.

In the event of damage to components in the system, there is the ability to dynamically reconfigure information flow. Preferably, there are N statically-defined node tables. Selection of which configuration to use is based on a system equipment manager partition that outputs the correct configuration to use. Based on the desired configuration, the correct node table is copied by an application from a file system on the host to the node. Alternatively, a trusted application can perform the configuration check.

Advantageously, use of the exemplary system and method described provides for the communication of unencrypted data in a secure manner. Time and cost are saved by avoiding the need to encrypt secure data or allocate dedicated hardware resources to different safety criticality levels or security levels.

While the exemplary embodiments illustrated in the Figures and described above are presently preferred, it should be understood that these embodiments are offered by way of example only. Other embodiments may include, for example, different hardware and software structures and combinations of hardware and software. The invention is not limited to a particular embodiment, but extends to various modifications, combinations, and permutations that nevertheless fall within the scope and spirit of the appended claims.

What is claimed is:

1. A method of communicating information in a system having multi-level security requirements, the method comprising:
   receiving a packet having unencrypted data at an Ethernet switch, the packet comprising a header portion and a data portion; transmitting the packet to a node from the Ethernet switch based on a media access control address and data received by the Ethernet switch;
   routing the packet to a host from the node based on an Internet Protocol Address in the packet, the host including a number of virtual hosts, each virtual host having a unique Internet Protocol Address, a protected address space, an application in an application partition and a protocol stack;
   processing the packet at the host such that data from the packet is maintained in the protected address space associated with the virtual host;
   adding an application partition to a multi-cast group based on a node table; and
   wherein the data portion comprises at least one of a low level security data and a high level data;
   wherein the virtual hosts are separated by an operating system kernel;
   wherein the node comprises an Ethernet node, the Ethernet node comprises a verified high assurance processor;
   wherein the verified high assurance processor is configured to comply with the multi-level security requirements of the system by controlling the transmission of the unencrypted data to a predetermined virtual host;
   wherein data from the application in the application partition is unreadable by another application in a different application partition;
   wherein the verified high assurance processor is further configured to conduct a control check on the received packet using the node table, the node table including a source verification table;
   wherein the verified high assurance processor uses the source verification table to ensure the source of the packet matches an expected remote Internet Protocol Address; and
   wherein the verified high assurance processor uses the node table to perform a configuration check on the system components using a trusted application and to dynamically reconfigure information flow in the system components in the event of component damage.

2. The method of claim 1, wherein the verified high assurance processor comprises an Internet Protocol router software.

3. The method of claim 1, wherein the protocol stack is a TCP/UDP-IP protocol stack.

4. The method of claim 1, wherein processing the packet at the host comprises processing the packet using the protocol stack at one of the virtual hosts.

5. A system for communicating information having multi-level security requirements, the system comprising:
   a node configured to receive a packet having unencrypted data from an Ethernet switch, the packet comprising a header portion and a data portion, the node further configured to route the packet to a host in a network based on an Internet Protocol Address in the packet, the host including a number of software applications, separate and protected address spaces, and protocol stacks;

an operating system kernel, the operating system kernel including a number of virtual hosts, wherein the number of virtual hosts are operable to process the packet using the protocol stack at the virtual host and process data in the protected address space associated with the virtual host;

wherein the node is configured to add an application partition to a multi-cast group based on a node table;

wherein the data portion comprises at least one of a low level security data and a high level security data;

wherein the virtual hosts are separated by the operating system kernel;

wherein the node comprises an Ethernet node, the Ethernet node comprises a verified high assurance processor;

wherein the verified high assurance processor is configured to comply with the multi-level security requirements of the system by controlling the transmission of the unencrypted data to a predetermined virtual host;

wherein the verified high assurance processor is further configured to conduct a control check on the received packet using the node table, the node table including a source verification table;

wherein the verified high assurance processor uses the source verification table to ensure the source of the packet matches an expected remote Internet Protocol Address; and wherein the verified high assurance processor uses the node table to perform a configuration check on the system components using a trusted application and to dynamically reconfigure information flow in the system components in the event of a component damage.

6. The system of claim 5, wherein the verified high assurance processor comprises an Internet Protocol router software.

7. The system of claim 5, wherein the virtual host includes a unique Internet Protocol Address.

8. The system of claim 5, wherein the number of virtual hosts have a number of Internet Protocol Addresses associated therewith.

9. The system of claim 5, further comprising a high assurance switch configured to receive the packet from a network and route the packet to the node based on information in the packet.

10. A system for communicating information having multi-level security requirements, the system comprising:

means for receiving a packet having unencrypted data at a host from a node based on an Internet Protocol Address in the packet, the packet comprising a header portion and a data portion, the host including a number of software applications, a protected address space, and a protocol stack;

means for processing the packet at the host such that data from the packet is maintained in the protected address space associated with the host;

means for adding an application partition to a multi-cast group based on a node table; and wherein the data portion comprises at least one of a low level security data and a high level security data;

wherein virtual hosts are separated by an operating system kernel, the virtual hosts comprising applications in application partitions;

wherein the means for receiving the packet having unencrypted data comprises an Ethernet node, the Ethernet node comprises a verified high assurance processor;

wherein the verified high assurance processor is configured to comply with the multi-level security requirements of the system by controlling the transmission of the unencrypted data to a predetermined virtual host;

wherein data from an application in a virtual host is unreadable by another application in a different application partition;

wherein the verified high assurance processor is further configured to conduct a control check on the received packet using the node table, the node table including a source verification table;

wherein the verified high assurance processor uses the source verification table to ensure the source of the packet matches an expected remote Internet Protocol Address; and wherein the verified high assurance processor uses the node table to perform a configuration check on the system components using a trusted application and to dynamically reconfigure information flow in the system components in the event of a component damage.

11. The system of claim 10, further comprising means for routing the packet to the host.

12. The system of claim 10, wherein the means for processing establishes a socket connection including a number of application partitions.

13. The system of claim 12, wherein the protected address space prevents data in one application partition from being read from another application partition.

* * * * *